April 24, 1962 A. J. WILTSHIRE 3,031,099
PRESSURE VESSEL AND METHOD OF MAKING THE SAME
Filed June 19, 1953 10 Sheets-Sheet 1

INVENTOR.
ARTHUR J. WILTSHIRE
BY
W. G. Sullivan
ATTORNEY

April 24, 1962  A. J. WILTSHIRE  3,031,099
PRESSURE VESSEL AND METHOD OF MAKING THE SAME
Filed June 19, 1953  10 Sheets-Sheet 2

INVENTOR.
ARTHUR J. WILTSHIRE
BY
W. G. Sullivan
ATTORNEY

INVENTOR.
ARTHUR J. WILTSHIRE
BY
W. G. Sullivan
ATTORNEY

INVENTOR.
ARTHUR J. WILTSHIRE
BY
ATTORNEY

INVENTOR.
ARTHUR J. WILTSHIRE
BY
M. D. Sullivan
ATTORNEY

April 24, 1962 A. J. WILTSHIRE 3,031,099
PRESSURE VESSEL AND METHOD OF MAKING THE SAME
Filed June 19, 1953 10 Sheets-Sheet 6
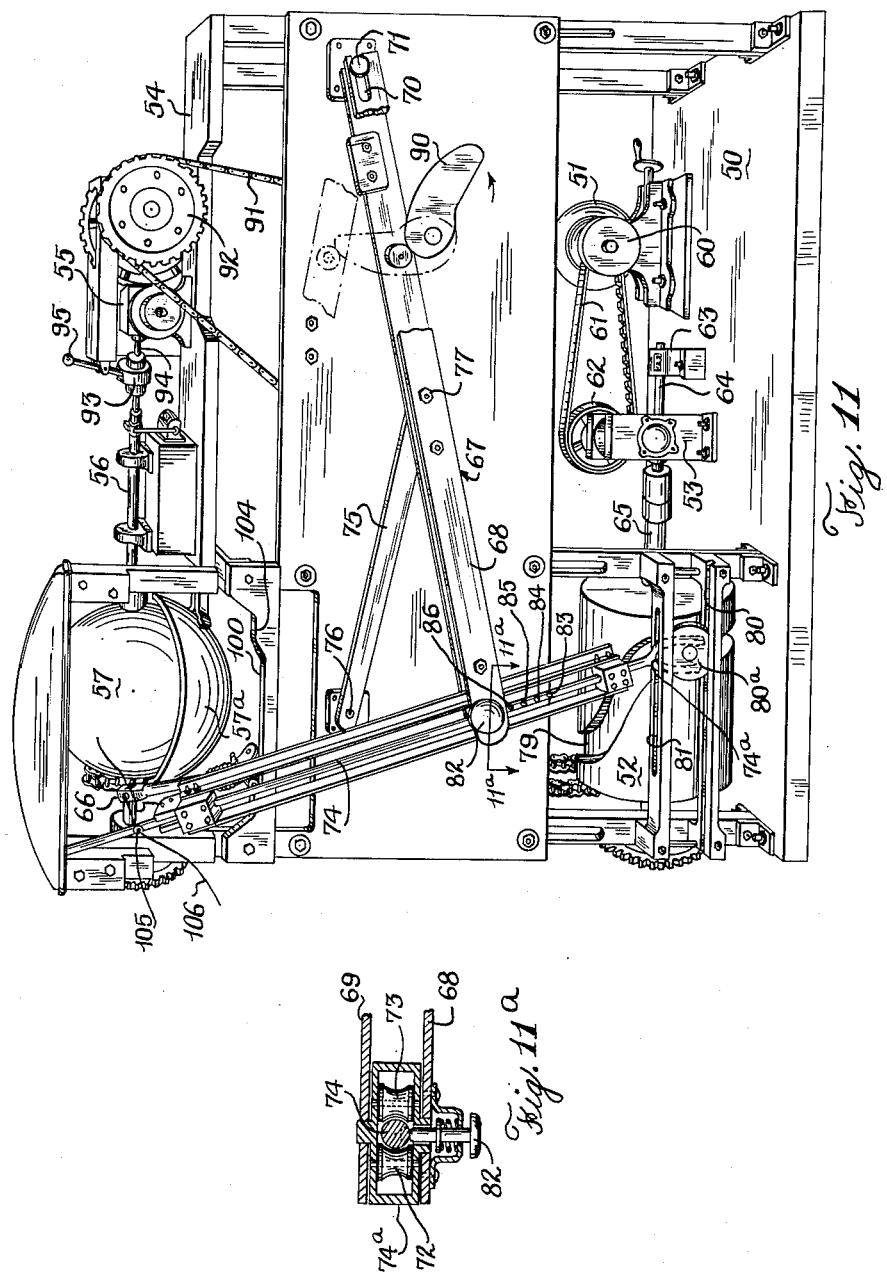
INVENTOR.
ARTHUR J. WILTSHIRE
BY
W. G. Sullivan
ATTORNEY

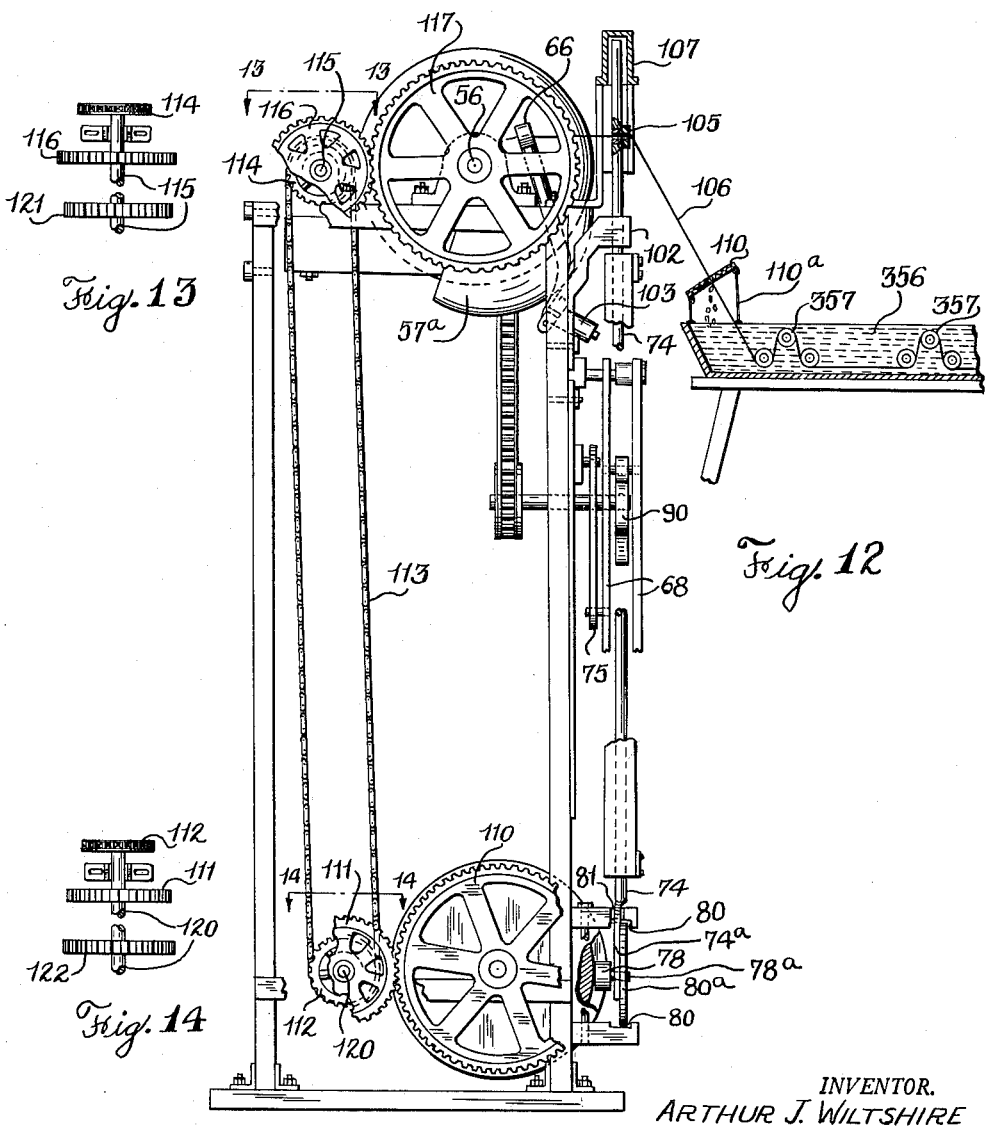

April 24, 1962     A. J. WILTSHIRE     3,031,099
PRESSURE VESSEL AND METHOD OF MAKING THE SAME
Filed June 19, 1953     10 Sheets-Sheet 8

INVENTOR.
ARTHUR J. WILTSHIRE
BY
W. G. Sullivan
ATTORNEY

April 24, 1962 A. J. WILTSHIRE 3,031,099
PRESSURE VESSEL AND METHOD OF MAKING THE SAME
Filed June 19, 1953 10 Sheets-Sheet 9

INVENTOR.
ARTHUR J. WILTSHIRE
BY
W. G. Sullivan
ATTORNEY

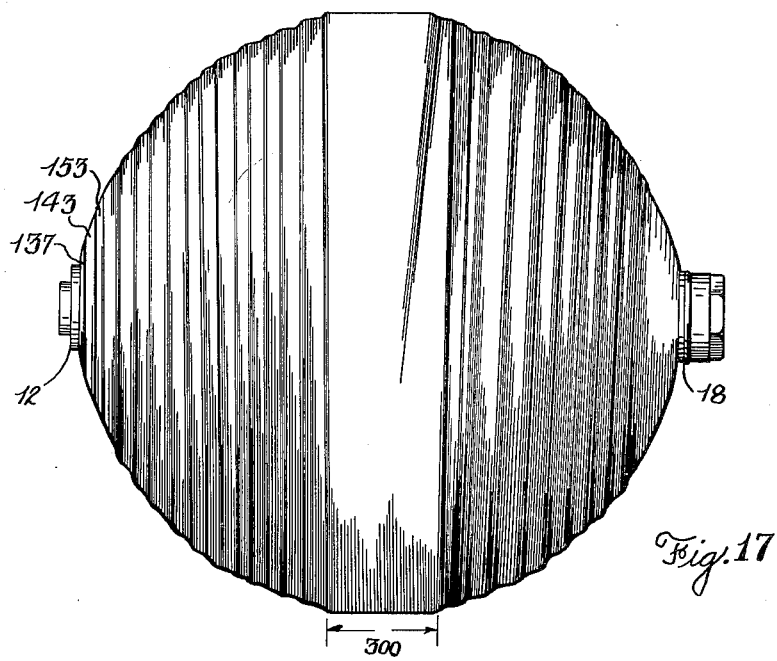
Fig. 17
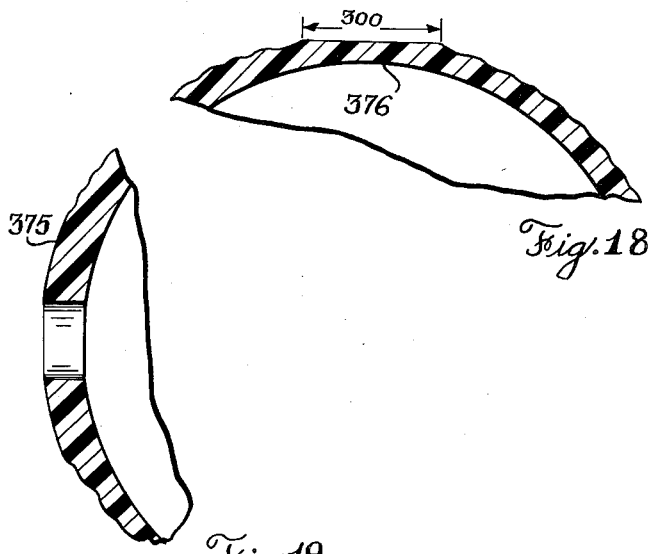
Fig. 18
Fig. 19
INVENTOR.
ARTHUR J. WILTSHIRE
BY
W. G. Sullivan
ATTORNEY

# United States Patent Office 3,031,099
Patented Apr. 24, 1962

3,031,099
PRESSURE VESSEL AND METHOD OF
MAKING THE SAME
Arthur J. Wiltshire, Richmond Heights, Ohio, assignor, by mesne assignments, to White Sewing Machine Corporation, Lakewood, Ohio, a corporation of Delaware
Filed June 19, 1953, Ser. No. 362,898
23 Claims. (Cl. 220—3)

This invention relates to pressure vessels and the method of making such vessels, and more particularly to a lightweight vessel for holding fluids or fluid pressure under high pressures throughout a wide range of temperature variations.

Reference is made to my co-pending divisional application, Serial No. 32,378, filed May 27, 1960 for "Apparatus for Making Pressure Vessels," which divisional application is directed to the apparatus for making the articles and for carrying out the method disclosed herein.

The pressure vessel made according to the present invention is one wherein the walls thereof comprises a plurality of flexible strands wound and arranged in the form of a surface of revolution so that when the vessel is subjected to high pressure, the deflection, due to such pressure, will be substantially uniform throughout the wall structure.

Numerous attempts have been made to construct vessels for fluid pressure by winding flexible strands about a metal form or shell in the shape of the finished vessel. In such prior art efforts and failures, the metal core to which the windings are applied becomes a part of the completed article. Such a core must be sufficiently rigid and dense to withstand the pressure applied in the winding. This results in a completed article comprising a metallic core and metal windings which results in a relatively heavy pressure vessel. Prior art efforts to reduce the weight which failed included heavy end forgings to hold the outlet pipe for the pressure vessel welded or otherwise secured to a thinner metal wall section for the balance of the pressure vessel. It is a characteristic of the present invention that the core employed to withstand the pressure of the winding is removed and does not become a part of the finished article. It is also a characteristic of the present invention that a material, such as fibrous glass, having an ultimate strength of three hundred thousand pounds per square inch and specific gravity of 2.5 is utilized whereas such prior art efforts and failures employ a material such as steel having an ultimate strength of two hundred thousand pounds per square inch and specific gravity of 7.8. Accordingly, the pressure vessel of the instant invention is one having marked advantages with respect to overall weight and efficient use of the materials employed over the prior art efforts.

High pressure fluid vessels of the type to be described are adapted to various uses wherein it is desired to store gaseous or liquid fluids under pressures which may reach several thousand pounds per square inch. For example, in starting jet engines employed for driving airplanes, a source of air under high pressure may be used, and if a fluid vessel for this purpose is carried by the airplane, it should be relatively light in weight and formed of material which will not shatter or throw fragments at high velocity if the vessel is pierced by a bullet or otherwise damaged while the vessel is under high pressure. The high pressure air may also be used for operating auxiliary equipment on aircraft. Fluid vessels for this purpose should repeatedly withstand working pressures, such as three thousand pounds per square inch, and have a bursting pressure such as seven thousand pounds per square inch or more.

According to the present invention, a cast metal core structure, wherein the metal has a low melting point, is employed as a form upon which are applied continuous windings of flexible strands, such as, for example, fibrous glass. Preferably, the fibrous glass windings are bonded to each other by being coated during the winding with a resin which may be polymerized. When the windings of the vessel have been completed, the vessel, including the metal core, is cured so as to substantially complete the polymerization of the resin. Such curing may be effected at temperatures below the melting point of the metal of the core so that after the resin is cured and the vessel is fixed as to shape, the metal core is melted and may flow out of the vessel through the opening which is provided for the introduction of fluid pressures.

It is among the objects of my invention to provide a method of making a pressure vessel in the form of a surface of revolution which includes the steps of supporting a cast metal core on the axis of the surface of revolution and wherein the core corresponds to the interior of the finished vessel and thereafter rotating the core on said axis and at the same time applying to the rotating core a winding of resin coated fibres and thereafter curing the resin so as to bond the fibres to each other and melting the metal of the core out of the vessel.

It is a further object of my invention to provide a pressure vessel made according to the preceding object.

It is a more specific object of my invention to provide a method of making a pressure vessel having an outlet pipe which comprises rotating a form corresponding to the interior of the container about an axis coincident with the axis of the outlet pipe and at the same time applying flexible windings to the form from a point adjacent the outlet pipe to a point on the form adjacent the other end of said axis and thence back to the first point while the form is being turned on its axis through more than one revolution so that the windings in contact with the outlet pipe are tangent to the pipe at two spaced points so that the wall of the container is reinforced around the outlet pipe and the pipe is securely fixed to the wall of the container.

It is a further object of my invention to provide a method of winding a pressure vessel wherein each winding is substantially in the plane through a great circle and wherein the time of the traverse cycle of the winding corresponds to the time required for one revolution of the arbor and the traverse stroke is progressively decreased during the winding to form spiral windings.

It is a further object of my invention to provide a method of making a pressure vessel according to the preceding object wherein a number of windings are applied to the form adjacent the outlet pipe for a considerable portion of the wall area around the outlet pipe wherein each half winding is in a great circle angularly displaced from the great circle plane of the next half circle and thereafter the balance of the wall area of the vessel is wound so that each successive wrap of the winding is approximately in a great circle plane.

It is a further object of my invention to provide a method of making a pressure vessel according to the two preceding objects wherein the windings are in the form of resin coated fibrous glass which may be cured when the windings are completed and wherein the form may be removed after the windings are cured.

It is a further object of my invention to provide a pressure vessel made according to the three preceding objects.

It is a further object of the invention to provide a pressure vessel which is relatively light in weight, which may repeatedly be subjected to high pressures, which will withstand wide variations in temperature, and which will not shatter when pierced.

Further objects and advantages relating to light-weight, high strength, economies in manufacture, and efficient use of the materials involved will appear from the following description and the appended drawings, wherein:

FIGURE 11 is a front elevation of the winding machine employed to carry out one of the steps of making the pressure vessel according to my invention;

FIGURE 11a is a sectional view taken on the plane indicated at 11a—11a in FIG. 11;

FIGURE 12 is an end view of the winding machine with parts broken away to illustrate the drive relation between the arbor and the drum employed to traverse the windings;

FIGURE 13 is a plan view showing the change speed gearing looking from plane 13—13 of FIGURE 12;

FIGURE 14 is a plan view of the change speed gearing for the drum drive looking from the plane indicated at 14—14 of FIG. 12;

FIGURE 17 is an elevation showing the completed pressure vessel;

FIGURE 18 is a sectional view of a portion of the wall of the pressure vessel taken near the equator of the spherical form of the invention; and FIGURE 19 is a sectional view of the pressure vessel taken at the opening for the outlet pipe for the vessel.

In the form of the invention illustrated and described in detail herein, the pressure vessel or container is in the shape of a sphere having an outlet fitting at one end of an axis through the sphere and a fitting at the opposite end of the same axis of the sphere. For convenience, the outlet fitting will be referred to as being at one pole of the sphere and the closed or blind fitting at the other end as being at the other pole of the sphere. Similarly, the plane through the sphere normal to the polar axis midway between the fittings will be referred to as the equator of the sphere. As the description proceeds, it will be noted that many of the individual wraps of the windings about the sphere are substantially in a great circle plane and will be referred to herein as great circle windings. It will be understood that pressure vessels may be made according to this invention which are oblate spheroids or which are elliptical in cross section or which are cylindrical in part and which have spherical or elliptical ends and that in all cases such pressure vessels are in the form of a surface of revolution and that the windings are applied to the vessel by rotating the form on an arbor which is coincident with the axis of the surface of revolution.

Figure 1:
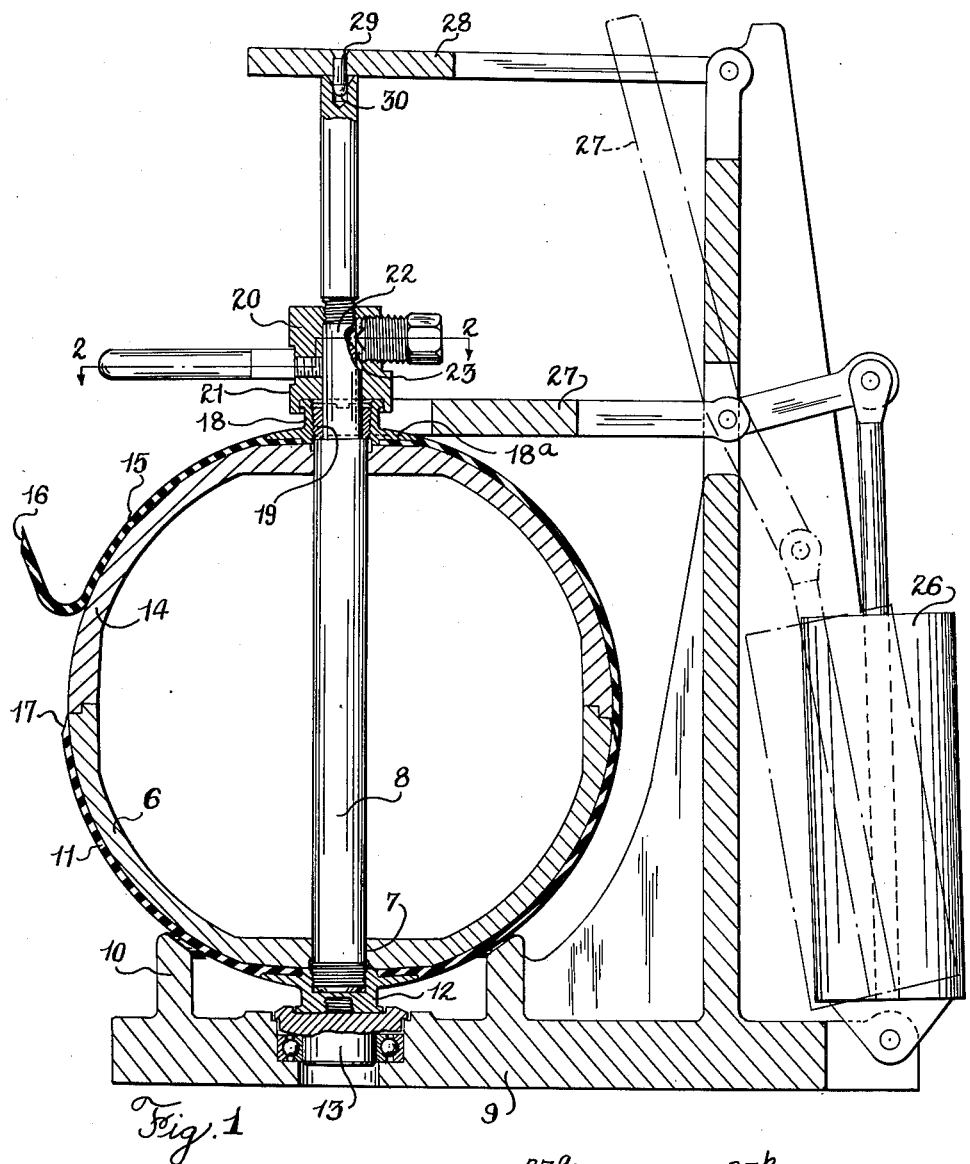
FIGURE 1 is a sectional elevation of an assembly fixture for holding the core parts assembled prior to the winding of the pressure vessel.
Figure 2:
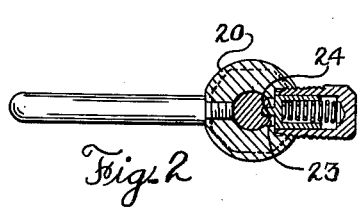
FIGURE 2 is a sectional view taken on the plane indicated at 2—2 of FIG. 1, showing the details of the apparatus for aligning the winding arbor with the outlet fitting for the pressure vessel.
Figure 2A:
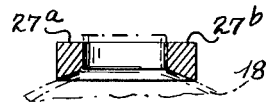
FIGURE 2a is a sectional view of a fork member employed in the assembly of the core parts of the pressure vessel.

To provide a rigid core which will withstand the pressure imposed by the application of the windings which make up the walls of the pressure vessel, two cast hemispheres of metal are employed. Referring to FIGURE 1, the lowermost hemisphere, as at 6, is apertured as at 7 to receive the arbor 8. An assembly fixture having a base 9 and an annular upstanding rib 10 is shaped to receive a rubber hemisphere 11. The rubber hemisphere 11 is provided with a metal fitting 12 which is internally threaded to receive the threaded end of the arbor 8. The fitting 12 is received in the upper recess in rotatable member 13 carried by bearings in the bed frame of the fixture 9. In assembly, the cast metal hemisphere 6 is nested within the rubber liner member 11 and a complimentary cast metal hemisphere 14 is arranged on the arbor 8 above the casting 6. Preferably, the two castings are rabbeted as shown to maintain the metal hemispheres in alignment. A complementary rubber liner member 15 is placed over the upper casting 14 and the edges of the two rubber hemispheres 11 and 15 are cut or molded to provide a scarf joint as shown at 16 and 17. The rubber liner member 15 is provided with a metallic fitting 18 which forms the outlet pipe in the completed pressure vessel. The fitting 18 is internally threaded to receive a threaded collar 19 which is placed on a reduced diameter section of the arbor 8. It will be observed that the collar 19 carried by the arbor fixes the metallic outlet pipe 18 axially with respect to the fitting 12 at the lower end of the arbor. This arrangement results in the arbor taking the axial thrust imposed by the end winding. The outer end of the outlet pipe 18 is provided with a polygonal contour flange and a wrench member 20 is provided with a similarly shaped socket 21 to fit the flat sides of the flange of the outlet pipe. The reduced portion of the arbor shaft as at 22 is provided with a keyway 23 employed to drive the arbor shaft 8 during the winding of the sphere. During such winding, it is important that the winding adapter on the arbor shaft line up with the keyway 23 in the arbor as well as with the flat sides of the flange on the outlet pipe 18. Accordingly, the wrench member 20 is provided with a spring pressed detent 24 which will drop into the keyway 23 when the wrench member 20 is turned on the arbor shaft. Accordingly, the procedure during assembly is to slip the wrench socket 21 over the flats on the member 18 and rotate the fitting 18 and its liner until the flats are properly aligned with respect to the keyway 23.

Figure 3:
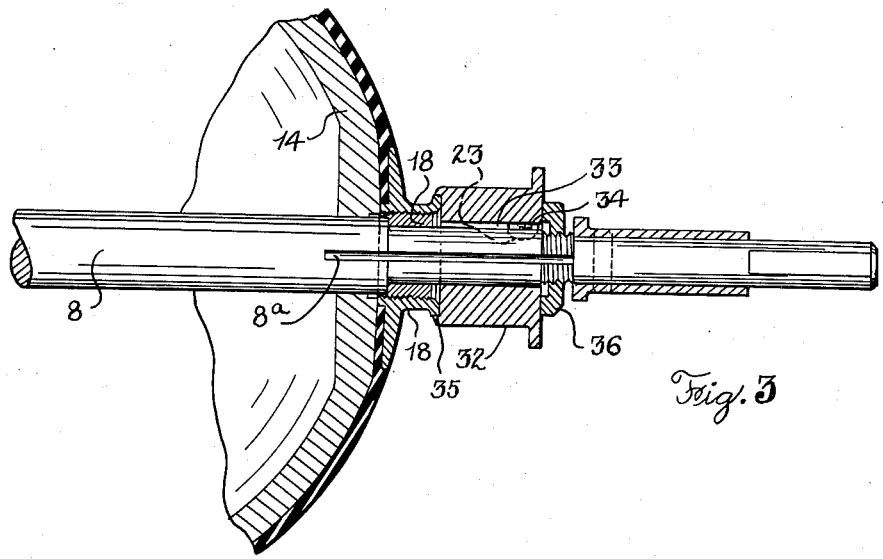
FIGURE 3 is an elevation which parts in section showing the core for the vessel and the liner for the vessel assembled on the winding arbor.
Figure 4:
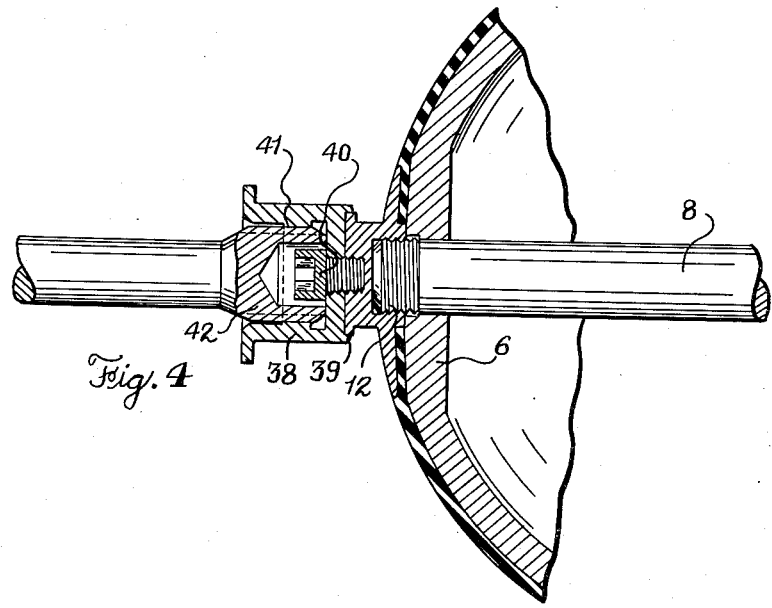
FIGURE 4 is an elevation with parts in section, similar to FIG. 3, but illustrating the opposite end of the arbor and core connection.

With the parts assembled and aligned as above described, the wrench member 20 is removed from the arbor and the air cylinder 26 on the assembly fixture is actuated to move the fork member 27 downwardly on the assembled core parts adjacent the arbor (as shown in full lines in FIG. 1). This effectively presses the two metal hemispherical castings 6 and 14 into snug engagement and holds the parts so assembled while the collar 19 is inserted and drawn down to abut the internal shoulder on the arbor. Now the cylinder 26 is released to swing the arm 27 to its dotted line position and the winding adapter 32 is assembled on the arbor. The scarf joint on the liner is cemented at 16—17. A pivoted aligning bracket 28 is carried at the top of the assembly fixture. It is provided with a boss 29 adapted to fit within a recess 30 at the end of the arbor shaft. When the member 28 is in the position shown in FIG. 1, the arbor is maintained in a true vertical position. After the pressure has been applied by the member 27 through the fork portions 27a and 27b, the member 28 may be swung upwardly away from the end of the arbor. The member 32 includes a keyway 33 and a key 34, which key is received in the keyway 23 of the arbor shaft 8. The member 32 is provided with a polygonal socket 35 which fits on the flats of the flange of the outlet pipe 18. A clamping nut 36 is employed to hold the driving member or adapter 32 in locked position as shown in FIG. 3, and this portion of the core and arbor assembly is ready to be placed in the winding machine to form the walls of the pressure vessel by the application of flexible strands to the core. That portion of the arbor 8 which extends through the outlet 18 and the adapter is provided with an air vent groove 8a to equalize pressure changes due to temperature variations. The fitting 12, carried by that point on a sphere opposite the outlet pipe 18, is also provided with a winding adapter as shown in FIG. 4.

This support comprises a cup-like member 38 having a wrench socket 39 to receive a hexagonal portion on the fitting 12. The member 38 is secured to the fitting 12 by a cap screw 40 and the member 38 is internally splined as at 41 to receive the external splines on a driving member 42. The driving member 42 is suitably recessed to accommodate the cap screw 40.

The winding machine employed for winding the flexible strands about the core is illustrated in its entirety at FIG. 11 and comprises an upright frame having a base 50 which supports a power unit such as a motor 51, a traverse drum 52 and gear box 53. Supported by vertical frame members is a horizontal platform 54 upon which is mounted a cam gear box 55 and a drive shaft 56 coupled to a fitting on the spherical core indicated in its entirety in this view as at 57. In operation, the motor 51 through a change speed pulley 60 drives a belt 61, which, in turn, drives the pulley 62 of the gear box 53. The gear box 53 includes speed reducing gearing which forms no essential part of the present invention. A counter 63 is mounted on the base 50 and is actuated by an eccentric, not shown, on shaft 64 coming from the gear box. The shaft 64 and the drive shaft 65 from the gear box turn at the same speed so that the counter indicates the number of revolutions of the shaft 65 which rotates the traverse drum 52.

It will be understood as the description proceeds that the drive from the shaft 65 is transmitted to the arbor shaft of the sphere 57 so that during the winding the traverse drum 52 effects an oscillation of the winding needle 66 at the same time the sphere is rotated. A fulcrum assembly, indicated in its entirety as at 67, includes a pair of spaced bars 68 and 69. One end of the pair of bars (the right hand end in FIG. 11) is slotted as at 70 so as to pivot and slide on a fixed pin 71 carried by the frame. The other end of said bars 68 and 69 is provided with a pair of rollers 72 and 73, one roller being disposed on each side of the traverse arm 74. It will be noted from FIG. 17a that the rollers are supported in a pivoted frame 74a to prevent binding. A pivoted link 75, which is pivoted as at 76 to the frame and at 77 to the bars, provides additional support for the fulcrum arm 67. The lower end of the traverse rod 74 is provided with a roller 78 which rides in a cam track 79 on the traverse drum 52. The lower end of the traverse rod extends through a slot 81 and is forked as at 74a to receive pin 78a of roller 78 to accommodate the arcuate travel of the lower end of rod 74. Pin 78a and roller 78 are guided in a horizontal path by a disc 80a secured to pin 78a. Disc 80a is guided by horizontal tracks 80.

The cam track 79 on the drum 52 is preferably shaped to provide about ninety-seven degrees of dwell for the traverse arm 74 at each end of the traverse stroke. This results in a relatively fast travel of the needle from one end of the form to the other and permits the windings to skid into place during the dwell.

The oscillation of the traverse rod 74 may be about a fixed pivot effected by latch 82 when it is desired to maintain a fixed traverse stroke or about the rollers 72 and 73 when a variable stroke is desired. The latch 82 is normally spring pressed toward spaced apertures 83, 84, 85 and 86 provided in the traverse rod. When the fulcrum arm 67 is rocked so as to permit the plunger of latch 82 to enter any of the recesses 83–86, the pivot point of the traverse rod 74 is maintained in a fixed position, and thus, a fixed stroke of the needle from one end of the sphere to the other is maintained. When a variable stroke is being used the link 75 functions to insure that the pivot point for the traverse arm 74, as determined by the position of rollers 72 and 73, moves in a substantially vertical line or plane passing through the equator of the sphere since the distance between pivot points 76 and 77 of link 75 is the same as the distance between pivot point 77 and the pivot point of arm 74. When the latch 82 is in the lowermost notch 83, the traverse of the needle is from a point adjacent one fitting on the sphere to a point adjacent the opposite fitting on the sphere thence back to the starting point. The preliminary windings of the sphere are preferably accomplished by the use of a fixed traverse, whereas, following the preliminary windings, the traverse stroke is continuously decreased by means of a cam 90 which is gradually turned during the progress of the winding through the gear box 55 and the chain and sprocket 91, 92. A jaw clutch 93 is interposed between the arbor shaft 56 and the input shaft 94 for the gear box 55. Thus, after the preliminary windings on the sphere are completed, the jaw clutch 93 is engaged by swinging the lever 95 to effect a drive through the gear box 55 and thus change the traverse stroke during the balance of the windings on the sphere.

Figure 15:
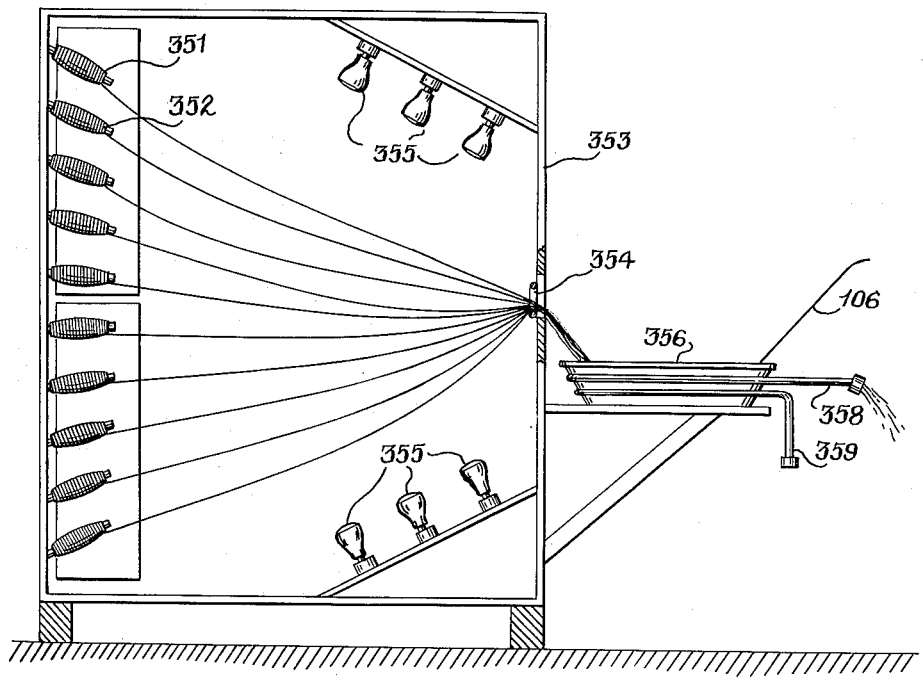
FIGURE 15 is an elevation showing the creel and resin coating apparatus employed to prepare the fibres for the winding operation.
Figure 15A:
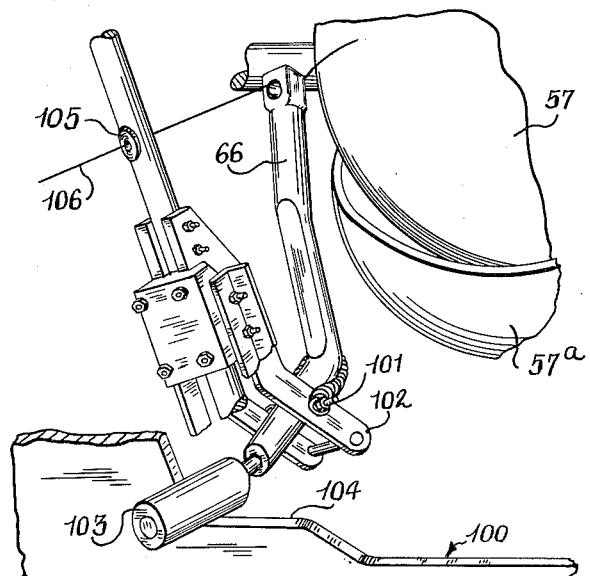
FIGURE 15a is a perspective view of the winding needle and cam for winding.

During the traverse of the winding, it is desirable to carry the eye of the needle 66 from a point adjacent one fitting to a point adjacent the other fitting in a curved path adjacent the core of the sphere. To accomplish this, a cam track 100 is fixed to the frame below the sphere. As best shown in FIG. 15a, the needle 66 is pivoted at its lower end as at 101 to a bracket 102 carried by the traverse rod assembly. An offset pivoted roller 103 is carried by the lower end of the needle 66 and the roller 103 rides on the cam track 100. The cam track has high areas, such as 104, at each end so that as the roller traverses the high portions of the cam track, the upper end of the needle will be swung inwardly to a position immediately adjacent the fittings. This arrangement insures the correct directional pull on the strands as they are being wound about the sphere. Above the bracket 102 on the traverse arm at its upper end is a guide bushing 105 which carries the flexible strand 106 to and fro with the needle 66. The portion of the traverse arm 74 projecting above the bushing 105 is guided in a channel member 107.

To transmit the drive from the motor to the arbor shaft, the shaft of the traverse drum 52 is provided with a gear 110 arranged to mesh with a gear 111 which drives a chain sprocket 112. A chain 113 transmits the drive from sprocket 112 to a sprocket 114 mounted on a shaft 115 on the upper platform of the machine. The shaft 115 is provided with a gear 116 in mesh with a larger gear 117 on the arbor shaft 56. During the application of the preliminary windings, i.e., the windings with the greatest traverse stroke, the gears effecting the drive are selected so that the arbor shaft turns through about one and one-quarter revolutions while the traverse drum turns through but one revolution. As will be understood from the description which follows, such windings brings the strand into arc contact with the outlet pipe and reinforces the unsupported wall area at the fitting when internal fluid pressure is applied. The difference in rotation between the arbor shaft and the traverse drum shaft is accomplished by using a gear, such as 111, having ninety-six teeth in mesh with the gear 110. This gear 111 is fixed to the shaft 120. When the gear 111 is used on shaft 120, a gear 116 having one hundred and twenty teeth is employed on the upper shaft 115. Thus, assuming that the gears 110 and 117 are of the same diameter, the use of a ninety-six tooth gear at 111 and the use of one hundred and twenty tooth gear at 116 effects what is referred to herein as a fast feed. By fast feed it is meant that the end windings are effected with a fast rotation of the arbor so that the arbor turns more than one revolution while the traverse drum turns but one revolution. After the preliminary windings are completed with the fast feed, the gear 116 is replaced by a smaller gear 121 which may be a gear having one hundred teeth. At the same time the gear 111 on the shaft 120 is replaced by a gear 122 which also has one hundred teeth. Such change of gear ratio may be obtained by change speed gears in the locations referred to or by removing the gears 116 and 111 and replacing such gears with the gears 121 and 122. With the gears 121 and 122 in place, the arbor rotation will correspond to the rotation of the traverse drum and this type of feed will be referred to herein as a slow feed. Actually gear 110 has two hundred and one teeth while gear 117 has two hundred teeth so that the arbor shaft turns slightly more than one revolution while the traverse drum turns through one revolution so that there is a slight progression of the individual wraps of the windings around the sphere during the so-called slow feed. During the slow feed the latch 82 on the traverse rod is ineffective to fix the fulcrum point of the traverse rod, and the stroke of the traverse rod with respect to the sphere is continuously changed by reason of the movement of the cam 90 which progressively raises the fulcrum point and shortens the traverse stroke.

Figure 5:
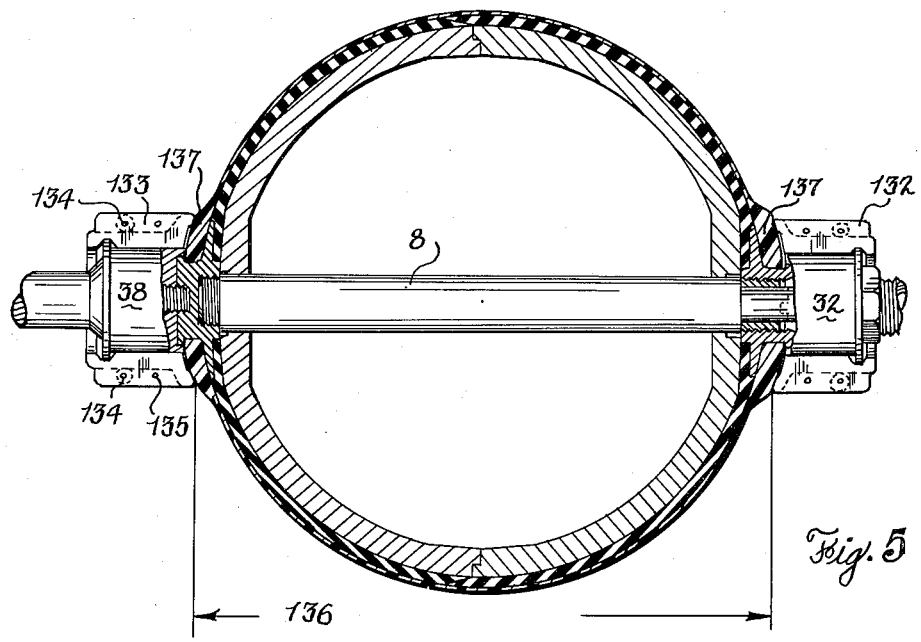
FIGURE 5 is an elevation of the core and arbor as assembled for the first series of windings on the core.

As best shown in FIG. 5, to facilitate the formation of a wall structure around the outlet pipe, the adapters 32 and 38 at each pole of the sphere are provided with winding guides 132 and 133. Each winding guide comprises semi-cylindrical sections which are clamped to each other around the adapters 32 and 38 by means of clamping bolts through the openings 134 and dowel pins 135, the near section of each winding guide has been omitted for clearness of illustration. The winding of the fibrous glass is then started by rotating the arbor 8 with a fast feed as above described. This winding is continued with a stroke as indicated at 136 whereby the winding needle spans the ditsance between the inner edges of the winding guides 132 and 133. The winding guides are preferably formed with a spherical contour opposite the spherical surface of the core, and as the resin impregnated winding is applied, the strands adjacent the end fittings of the sphere skid into place and form a wall section indicated at FIG. 5 as at 137. This portion of the wall of the sphere indicated at 137 completes the wall of the sphere in those areas between the core and the winding guides 132 and 133. I have found that when winding a sphere having a diameter or about twelve inches and using sixty fibrous glass ends as a flexible strand, a satisfactory pressure vessel will be obtained by winding the area at 137, shown in FIG. 5, with five hundred and eighty-three turns of the arbor shaft 8.

Figure 6:
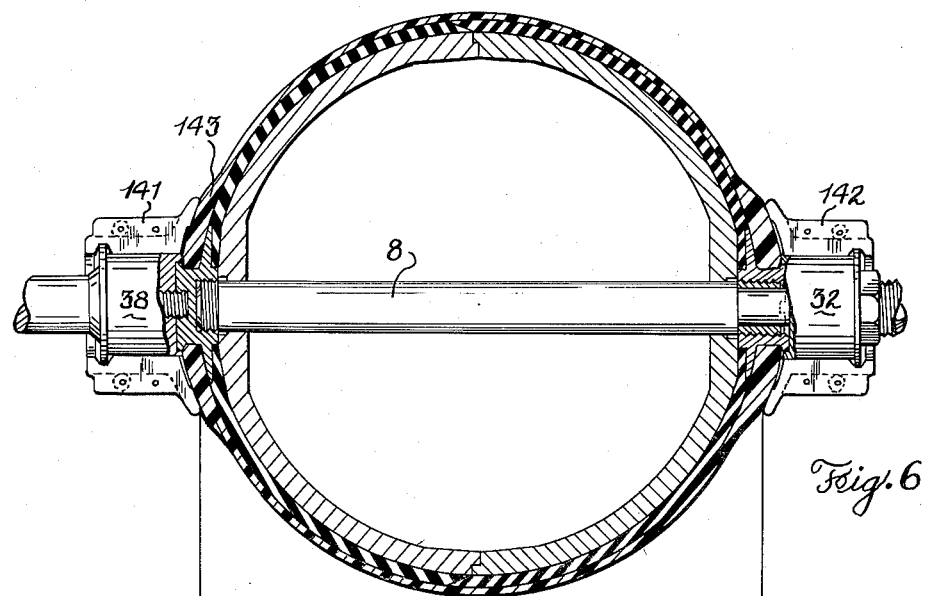
FIGURE 6 is a view similar to FIG. 5, showing the parts as assembled for the second series of windings on the core.

Following the application of the first windings, as above described, a second set of winding guides 141 and 142 are applied to the adapters 32 and 38. The winding guides 141 and 142 are similar to those employed in the first winding but provide for an increased diameter. As illustrated in FIG. 6, the guides are clamped in place over the area 137 of the wall completed in the first winding. The peripheral edges of the guides project beyond the area 137 and winding is continued with a fast feed to fill in the space between the winding guides and the core and thus complete the wall sections 143. During the winding of the sphere with the guides 141 and 142 in place, I have found that the area is compactly filled in a sphere as above described by rotating the arbor four hundred fifty-six times. Thus, the wall areas 137 and 143 are completed with a total of eight hundred eighty arbor turns.

Figure 9:
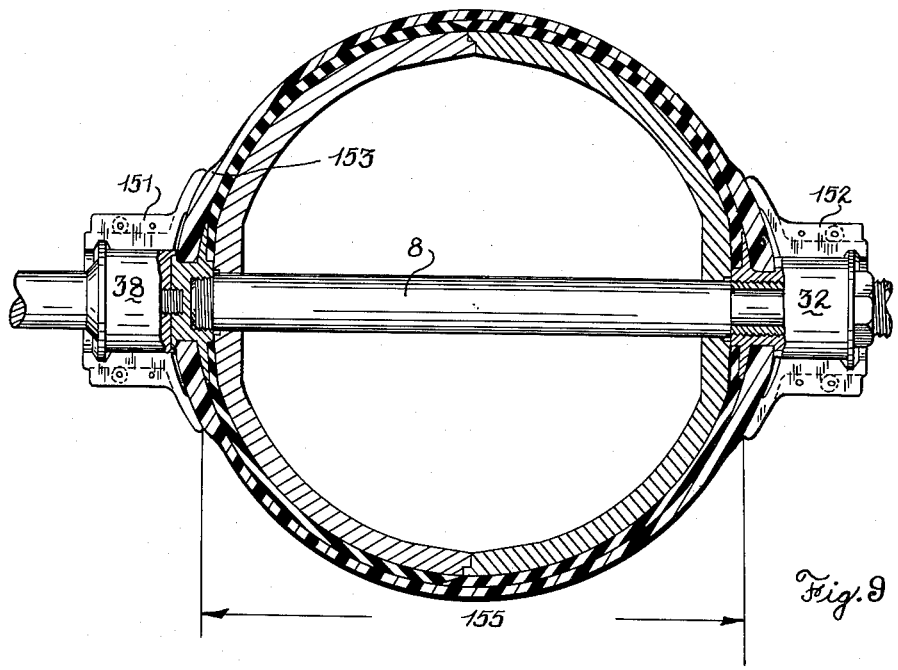
FIGURE 9 is a view similar to FIGS. 5 and 6, showing the winding fixtures employed for the application of the third series of windings characterized by a fast feed for the arbor.

The winding guides 141 and 142 are then removed and winding guides 151 and 152 are applied to provide a still further increase in diameter as illustrated in FIG. 9. The fast feed of the arbor is continued for about three hundred additional turns of the arbor so as to complete the wall of the sphere at the fitting zones by adding the section 153. It will be understood that the flexible strand is maintained unbroken during such fast feed of the arbor and that although three separate winding guides are used in succession, the formation of the wall is a continuous process. It will also be understood that when the second set of winding guides are employed, the traverse stroke is reduced as at 144 in FIG. 6. When the third set of winding guides are employed, the traverse stroke is further reduced as at 155 in FIG. 9.

Figure 7:
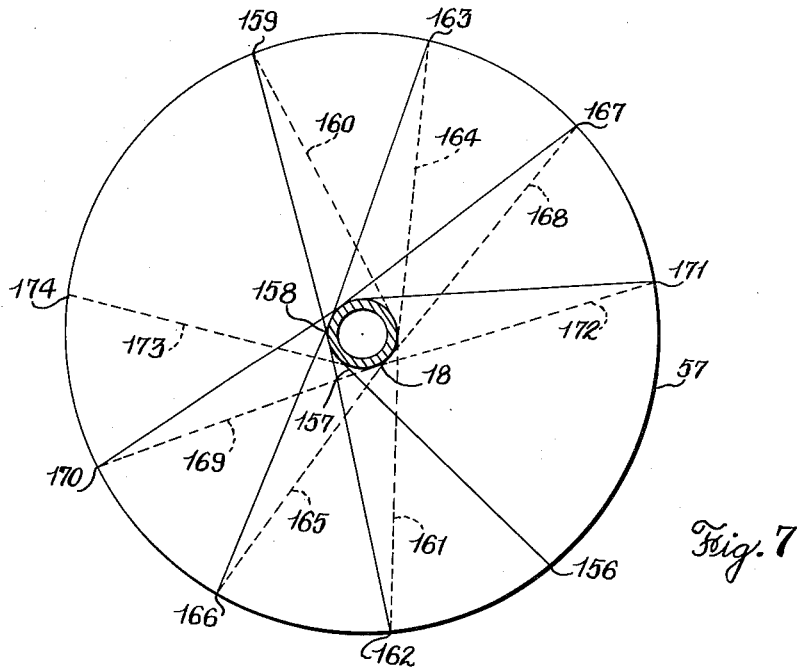
FIGURE 7 is an end elevation normal to the axis of the arbor, showing the application of the first series of windings characterized by a fast feed for the arbor.
Figure 8:
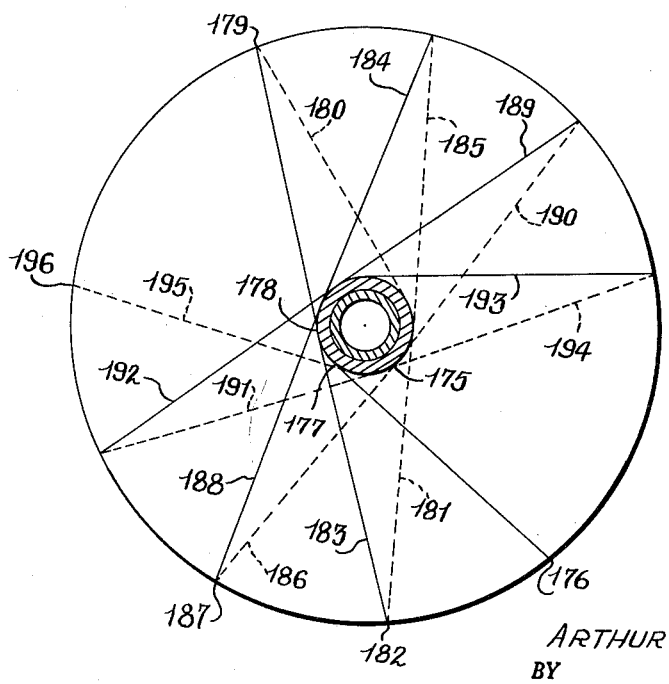
FIGURE 8 is an end elevation normal to the axis of the arbor, showing the application of the second series of windings characterized by a fast feed for the arbor.
Figure 10:
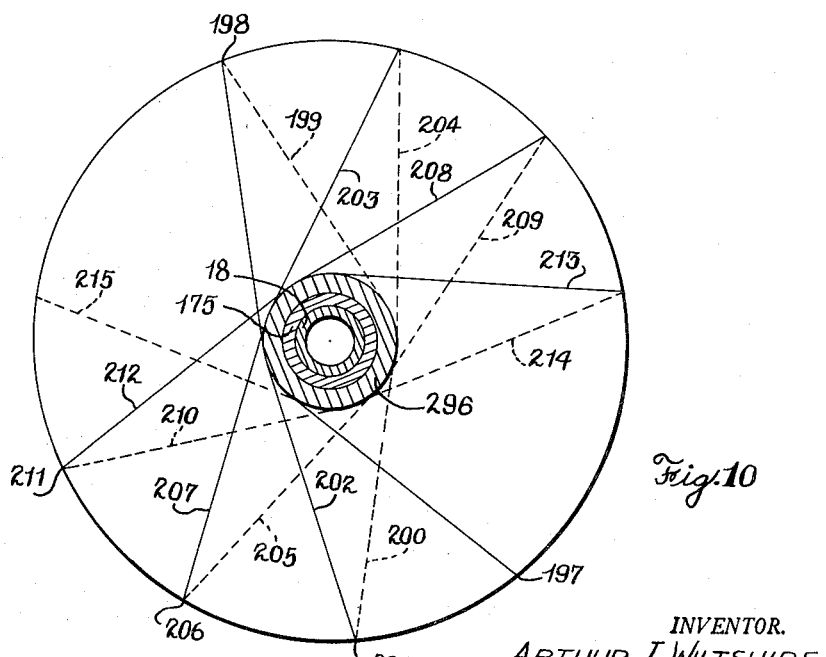
FIGURE 10 is a view similar to FIGS. 7 and 8, but showing the application of the third series of windings.

FIGS. 7, 8 and 10 illustrate the end portions of the sphere being wound corresponding to the transverse views of FIGS. 5, 6 and 9 respectively. For example, in FIG. 8, the area indicated in cross section at 175 (FIG. 8) corresponds to the wall section 137 of FIG. 5. Similarly in FIG. 10, the areas indicated in cross section at 296 correspond to the wall section 143 of FIG. 6.

With the first series of windings and with the traverse rod adjusted for the maximum stroke as described in connection with FIG. 5, the end view of the sphere looking toward the outlet pipe corresponds to the illustration of FIG. 7. Assuming that the winding is started on the equator as at 156 in FIG. 7, it is brought around into engagement with the outer wall of the outlet pipe as at 157. The strand is brought into contact as an arc in a plane substantially at right angles to the axis of end fitting 18 from the point of tangency 157 to point 158 and thence traverses back to the equator of the sphere 57 as at 159. From the point 159 on the equator, the winding continues as shown in dotted outline at 160—161 to point 162 on the equator. From point 162 the winding is brought again into engagement with a portion of the periphery of the pipe 18 and thence again to the equator as to point 163. Continuing from point 163, the winding is shown in dotted outline 164 and 165 to a point on the equator 166. From point 166 on the equator the winding is again brought into contact with a portion of the periphery of the outlet pipe 18 and thence to a point on the equator as at 167. The winding continues from 167, as shown in dotted outline 168—169, to a point on the equator as at 170. From the point 170 on the equator, the winding is brought into contact with the outlet pipe 18 for a portion of the periphery of the pipe and thence to point 171 on the equator. From point 171 on the equator the winding is shown in dotted outline 172—173 to point 174 on the equator. This preliminary winding with the first set of winding guides is continued until the arbor has turned about five hundred and thirty-eight times. With a sphere proportioned as described herein and with fibrous glass strands as herein described, the space between the first winding guides 132 and 133 and the core is substantially filled with wound fibrous glass. It will be noted by reference to FIG. 7 that successive windings or individual wraps are substantially spaced from each other at the equator, and in the present instance, after about four and one-half windings the windings begin to cross each other at points between the fitting 18 and the equator, which, in effect, provides a basket type weave. A second set of winding guides 141 and 142 are then applied and the traverse stroke is decreased as shown in FIG. 6. With such decrease in traverse effected by moving the latch 82 to the recess 84 the fast feed of the arbor is continued.

The area of fibrous glass around the fitting which is filled between the core and the first set of winding guides is indicated in FIG. 8 as at 175. It will be understood that with the shortened traverse stroke of FIG. 6, this area will not be again wound by the fibrous strand. Referring to FIG. 8 and again assuming that the winding is started at point 176 on the equator, it is brought into tangent contact with the annular area 175 as at 177. It remains in contact with the area 175 to point 178 and thence traverses the equator at point 179. From point 179 the winding is brought as indicated in dotted outline 180 around a similar area at the opposite pole through line 181 to point 182 on the equator. The winding thus proceeds with the fast feed following lines 183, 184, 185 and 186 to point 187 on the equator. From point 187 the winding follows lines 188, 189, 190, 191, 192, 193, 194, 195 and then to point 196 on the equator.

In FIG. 10, the fast feed on the arbor is continued and the winding starting at 197 is brought toward the center against the area 296 and continues about to the opposite equator as at 198. The winding continues as at 199 and 200 in dotted lines to emerge at the equator at the lower side of FIG. 10 at 201. Thence the winding proceeds with the fast feed on the arbor as indicated at 202, 203, 204, 205 to again emerge at the lower side of the equator at 206. The winding continues as at 207, 208, 209, 210 to a point on the equator 211. Such winding proceeds at 212, 213, 214 and 215 until the wall of the sphere is completed to fill the area 153 of FIG. 9. It will be understood that each change in the traverse stroke is accomplished by manually shifting the latch mechanism of FIG. 11a.

When the end windings accomplished with the fast feed are completed and the end wall areas 137, 143 and 153 are completed, the gears are shifted as above described in detail to effect a relatively slow feed on the arbor. With such relatively slow feed on the arbor drive, each winding is substantially in the plane of a great circle. Such windings are not mathematically in a great circle because the cam 90 is progressively changing the traverse stroke and the successive windings are, in effect, spiral windings closely approaching a great circle. However, the tension on the strand tends to pull each wrap into a great circle path and this fact, plus the flattening of the strand into band form and the lubricating effect of the liquid resin on the strand, results in the wraps between the fitting or polar end zones following a great circle path for practical purposes. In other words, there is no tendency of the wraps to slip laterally from a substantially great circle path or plane. In such cam controlled windings with a decreasing stroke, approximately two thousand three hundred and fifty-nine turns of the arbor are made. The winding is discontinued a substantial distance on each side of the equator as indicated at 300 in FIGS. 17 and 18. This results in the thinnest wall section being formed in the wide band at the equator. This is desirable to bring about a uniform deflection throughout the wall area of the sphere when the sphere is subjected to pressure. By progressively thinning the wall adjacent the equator, sharp changes in deflection are avoided. This appears to be due to the fact that the equator is a maximum distance from the opening in the wall for the outlet pipe.

When the sphere is completely wound as above described, it is transferred to an oven where it is baked at 200° F. for about four hours which completes the polymerization of the resin. The baking temperature is insufficient to melt the cast metal core members 6 and 14. After baking, the arbor is removed from the sphere and it is transferred to the fixture illustrated in FIG. 16. In this fixture comprising a base 251, an upstanding threaded pipe 252 receives the internally threaded fitting 18 which forms the outlet pipe for the sphere. Coaxially with the fitting 252 is an upwardly extending pipe 253 which is spaced around its periphery at the fitting to provide a passageway as at 254 for the molten metal of the core.

Preferably, the core material is a low melting point alloy formed to melt at about 280° F. Such an alloy may be made of two-fifths bismuth and three-fifths tin. It will be understood that other suitable low melting point alloys of this nature may be employed.

Figure 16:
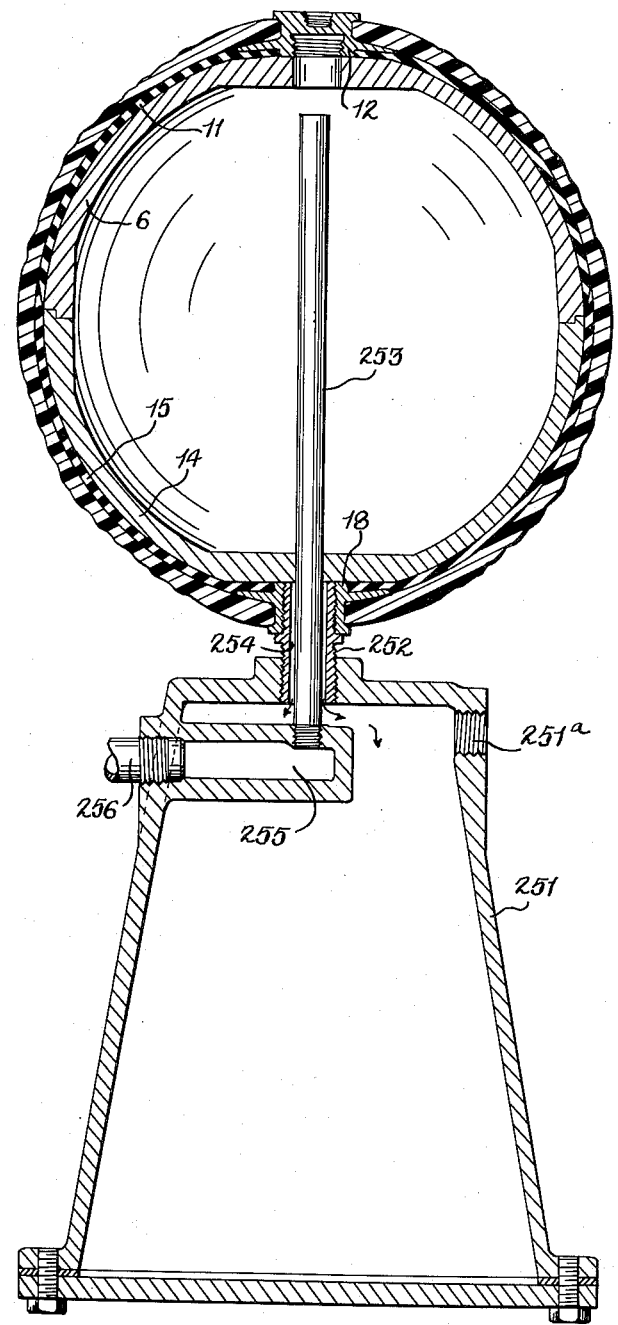
FIGURE 16 is a sectional view showing the pressure vessel and apparatus employed to melt and remove from the vessel the cast metal core.

The lower end of the pipe 253 which extends up into the sphere is anchored to an inlet chamber 255 adapted to receive steam through an inlet pipe 256. An air and steam vent valve is inserted in the threaded opening 251a of base 251. After the sphere is assembled on the fixture, as illustrated in FIG. 16, steam at twenty pounds gauge pressure is directed into the sphere through the pipe 253. Such steam will be at about 228° F. and will be insufficient to melt the metal core 6 and 14 but will be sufficient to effect a vulcanization of the scarf joint between the rubber liner members 11 and 15. Since the windings are applied under pressure, the scarf joint between the rubber lining members is vulcanized under pressure between the inner surface of the sphere and the outer surface of the metal core members 6 and 14. The vulcanization process is continued for about ten minutes and thereafter steam at fifty pounds gauge pressure is introduced. Such steam will be about 395° F. and when maintained for about ten minutes is effective to melt out all of the metal of the core members 6 and 14. The molten metal flows downwardoly by gravity into the passageway 254 between the pipes 252 and 253. Such molten metal will collect in the base 251 of the fixture and may be removed for casting new hemispheric core members.

The flexible material preferred for winding the spherical vessel is a strand made up of fibrous glass. Such fibres are formed by extruding molten glass through small openings and a number of such filaments, such as for instance two hundred filaments, are brought together about six feet from the point of extrusion and are sufficiently cooled at that point so that they may be wound on a spool which is known in the art as an "end." For some uses a number of such ends are wound together on a larger spool to form a roving; such rovings would be made up of from thirty to sixty ends wound together. Such rovings, however, are not suited to the efficient winding of a pressure vessel because of the variation in tension in the different ends which comprise the roving. According to my invention, I prefer to employ a creel, such as that illustrated in FIG. 15, wherein a number of spools or ends 351, 352 and the like are mounted on spindles within a casing 353. Preferably, about sixty spindles are provided so that sixty separate ends may be brought together through the eyelet 354 in the wall of the casing during the fast feed or in forming the vessel wall area at the fitting zones and about thirty spindles during the slow speed. Heat lamps 355 are provided to eliminate moisture which may have condensed on the ends within the creel or casing 353. It is a characteristic of fibrous glass that with temperature changes, the filaments tend to condense moisture which adversely affects the resin coating operation. Adjacent the creel is supported a resin coating tank 356. Transversely of the tank area supported coating studs 357 in staggered relation. The studs are concavely tapered or of reduced diameter centrally to gather the ends together when passing under and over the studs. In the present instance, the ends from eyelet 354 pass under a first stud adjacent the base of tank 356, over a second stud near the tank top, under third and fourth studs, over a fifth stud and under a sixth stud before leaving the tank. The tank is filled with liquid resin and the coating studs provide tension in the flexible strand 106 so that each individual end has imposed thereon the same tension and the degree of tension may be varied by the number of studs used. The equal tension results in the ends being parallel as they are drawn through the resin so that a uniform and complete resin coating is provided for each of the ends.

To minimize the effect of the heat transmitted to the ends by the lamps 355 and thus prevent the adverse affect of such heat on the liquid resin, cooling coils are applied to the resin tank 356. Such coils include an inlet for cold water 359 and an outlet as at 358. The flow of cooling water through the coil may be varied to control the optimum temperature of the liquid resin.

Although different resins may be employed for coating the glass fibres and bonding them to each other in the finished sphere, all such resins should be of the class known as thermosetting, so that the finished article will be suited for use at high temperatures. A resin well suited for this purpose is one known as epoxylene resin. Such resin is made by the Shell Chemical Company and is sold under the trade name Epoxy. Such resin is made from epichlorhydrin which is a byproduct in the production of glycerin from petroleum and which has been reacted with bisphenol-A. Ethylene glycol and perphaps some other chemicals may be used in the place of bisphenol-A. Such liquid resin, when to be used for the purposes here described, has added thereto immediately before use a catalyst to promote the polymerization of the resin. The liquid resin lubricates the fibrous glass filaments during the winding and thus facilitates the rapid winding without breaking any of the filaments. It will be understood by those skilled in the art that other resins such as polystyrene and some of the phenolic resins may be used.

The finished pressure vessel, as illustrated in FIG. 17, and the compact end wall sections 137, 143 and 153 are characterized by a smooth, dense surface. The balance of the windings characterized by the slow arbor feed and progressively shortened traverse stroke complete the balance of the wall surface of the spheres. As shown in FIG. 19, the end windings produce the thickest wall section as at 375 and that the wall section progressively thins from the outlet opening to the equator as at 376 (FIG. 18).

Although the preferred form of pressure vessel as herein described includes the rubber liner made up of hemispheres 11 and 15, such liner may be eliminated for certain uses. The particular vessel illustrated is designed for holding air at high pressures, such as 7,500 pounds per square inch and the liner seals against the loss of air pressure. It is contemplated that a similar seal may be effected by sloshing liquid resin or other sealing compounds within the sphere and thus eliminate the liner 11—15. The finished article, when made according to the method herein disclosed and proportioned to have a diameter of about twelve inches, will have an overall weight of about fifteen pounds. Such a vessel will efficiently hold compressed air at 3,000 pounds per square inch and will withstand repeated cycling at high pressures. For example, such a vessel has withstood a repeated cyclic change from zero to three thousand pounds per square inch approximately twenty-six thousand times without any sign of failure. The wall structure of the pressure vessel consists of about seventy-five precent glass and twenty-five percent resin.

The light-weight pressure vessel made according to the method herein described is particularly well suited for use in aircraft or airborne equipment since all comparable pressure vessels made of steel or conventional materials would weigh considerably more than the article herein described. Other advantages, particularly in military aircraft, are due to the non-shattering characteristics of the material employed. A comparable vessel, made of steel or conventional materials, would shatter violently when hit by a a bullet and the flying particles of such a vessel would have the characteristics of shrapnel. In the article according to my invention, there is no explosion of the vessel and bullets pass in and through the vessel without result other than a release of air through the opening formed by the bullet. The vessel made according to my invention will withstand a wide range of temperature variations, such as −67° F. to 160° F., particularly the ranges to which jet aircraft are subjected. The vessel may be advantageously used as an accumulator for actuating landing gear, ailerons and other movable aircraft components. It is well suited for brake actuation.

I am aware that the method herein disclosed may be advantageously employed in the fabrication of pressure vessels from other materials. For example, a steel sphere may be wound according to my method with steel wire and combinations of flexible steel windings and fibrous glass may be employed depending upon the deflection characteristics to be obtained. I am aware that efforts have heretofore been made to wind steam boilers with steel wire and to otherwise reinforce pressure vessels with steel windings, but such windings, to the best of my knowledge, failed to solve the problem.

For convenience, the wall section surrounding the fittings and including the areas created by the fast feed and indicated by the reference numerals 137, 143 and 153 will be referred to as the end zones of the vessel. I contemplate that the initial windings creating the end zones may be made without winding guides and that the first set of winding guides, such as 132 and 133 may be applied after such initial windings have been made. The windings disposed axially outwardly of the radially extending flanges of fittings 12 and 18 may be referred to as outboard of said flanges and windings disposed axially inwardly of the end zones may be referred to as inboard of said zones. In other words, the terms outboard and inboard refer to relative locations along the axis of the sphere or fittings rather than radially of such axis.

Referring to FIG. 12, as the strand 106 leaves the resin tank 356, I preferably provide wiping means in the form of a felt pad 110 which has a slit therein for receiving the strand 106 whereby the strand tends to carry the pad upwardly and this movement is resiliently restrained by rubber bands or the like 110a. Also, I preferably provide an arcuate drip pan 57a for receiving excess liquid resin from the fibrous glass during the winding process and preventing the resin from contacting the operating mechanism.

Although it is generally preferred to vary the wall thickness so as to obtain uniform deflection under pressure, I am aware that the equator area may be formed to provide greater deflection. This modification will insure that if failure should occur it will be at the equator and thus guard against blow out of the fitting. This form may be desired for safety with respect to fitting blow out but it does not provide for maximum pressure use and for repeated cycling such as characterizes the preferred form.

Although I have disclosed a spherical form of pressure vessel, and the method and apparatus for making that form in considerable detail, it will be understood that other forms may be used and the method, materials and apparatus varied within the scope of my invention as defined in the following claims.

What I claim is:

1. A pressure vessel adapted to receive fluids under high pressure comprising a shell corresponding to a surface of revolution, a flanged tubular fitting in the shell serving as a fluid entry and discharge port, said shell being formed of successive wrap windings of flexible material in strand form arranged to provide substantially uniform expansion of the shell under internal pressure, the innermost wrap windings passing outboard of the fitting flange, each of said innermost wrap windings substantially following a great circle path from a zone diametrically opposite the fitting and then passing through an arc outboard of the fitting flange and substantially in a plane at right angles to the fitting axis and then returning in a different substantially great circle path to said opposite zone, and a resinous bonding agent.

2. The pressure vessel as described in claim 1 and wherein the flexible material comprises a plurality of continuous fibrous glass filaments wound under uniform tension, the outermost wrap windings are disposed inboard of the fitting, and each of said outermost wrap windings follows a substantially great circle path.

3. The pressure vessel as described in claim 1 and wherein a second flanged tubular fitting is disposed in the shell diametrically opposite the fluid fitting, and the innermost wrap windings are disposed outboard of the flange of said second fitting in the same manner as described in connection with the fluid fitting.

4. A pressure vessel adapted to receive fluids under high pressure, said vessel comprising a substantially spherical shell having flanged tubular fittings at diametrically opposite points, said shell being formed of successive fibrous glass wrap windings arranged to provide substantially uniform expansion of the shell under internal fluid pressure, the windings being in the form of a strand with the innermost wrap winding substantially following a great circle path from the zone of one fitting to the zone of the other fitting, then following an arc around said other fitting and in a plane substantially at right angles to the fitting axis, then substantially following a different great circle path back to the zone of said one fitting, and a resinous bonding agent.

5. The pressure vessel as described in claim 4 and wherein the innermost wrap windings form a basket type weave in a zone spaced from each fitting, the outermost wrap windings are disposed inboard of the fittings and each of said outermost windings substantially follows a great circle path.

6. The pressure vessel as described in claim 4 and wherein a fluid impervious spherical inner liner abuts the fibrous glass shell, said inner liner being formed of material adapted to expand and contract under variations of fluid pressure within the vessel substantially coextensive with the fibrous glass shell.

7. The pressure vessel as described in claim 4 and wherein the arc form of the wrap windings around the fittings provides a retaining force preventing enlargement of the fitting hole and compensates for the unsupported area of shell at the fittings.

8. The pressure vessel as described in claim 4 and wherein each fitting has a second flange spaced outboard of the first flange thereby forming an intermediate pocket which receives the fibrous glass windings and rigidly locks the fitting to the shell.

9. A pressure vessel adapted to receive fluids under high pressure, said vessel comprising an inner shell, a fitting secured to said inner shell forming a port for the entry and discharge of fluid, said vessel including an outer shell formed of a substantially continuous strand of flexible material wound about the inner shell, each wrap winding at least inboard of the fitting substantially following a great circle path and the innermost of said wrap windings extending from a zone adjacent said fitting to a zone diametrically opposite said fitting, and succeeding windings having progressively lesser extent between said zones.

10. A vessel for storing fluids under high pressure, said vessel comprising an inner spherical shell, a fitting secured to said inner shell forming a port for entry and discharge of fluid, said vessel including an outer shell formed of a substantially continuous strand of flexible material wound about the inner shell in a plurality of layers of windings, each winding at least inboard of the fitting substantially following a great circle path and the innermost winding extending from a zone adjacent said fitting to a zone diametrically opposite said fitting and succeeding windings having progressively lesser extent between said zones.

11. A vessel for storing fluids under high pressure, said vessel comprising a spherical shell, a fitting on said shell forming a port for entry and discharge of fluid, said vessel including a substantially continuous strand of flexible material wound about the shell in a plurality of layers of windings, each winding at least inboard of the fitting substantially following a great circle path and the innermost winding extending from a zone adjacent said fitting to a zone diametrically opposite said fitting and succeeding windings having progressively lesser extent between said zones.

12. A hollow pressure vessel in the form of a surface of revolution about an axis, a fitting secured to said vessel forming a port leading to the interior of the vessel, said fitting being substantially aligned with said axis, said vessel having a wall structure comprising wound high tensile strength flexible material including a layer of convolutions lying substantially in planes through the geometric center of the vessel inclined at a small angle to said axis, said layer being distributed entirely around the vessel, and other layers of convolutions of lesser axial extent distributed entirely around the vessel lying substantially in planes through the geometric center of the vessel and inclined at greater angles to the said axis than said first-mentioned planes.

13. A hollow pressure vessel in the form of a surface of revolution about an axis, a fitting secured to said vessel forming a port leading to the interior of the vessel, said fitting being substantially aligned with said axis, said vessel having a wall structure comprising wound resin-bonded fiber glass filaments including a layer of convolutions lying substantially in planes through the geometric center of the vessel inclined at a small angle to said axis, said layer being distributed entirely around the vessel, and other layers of convolutions of lesser axial extent distributed entirely around the vessel lying substantially in planes through the geometric center of the vessel and inclined at greater angles to the said axis than said first-mentioned planes.

14. A hollow pressure vessel in the form of a surface of revolution about an axis, an impervious resilient liner at the interior of the vessel, a fitting secured to said vessel forming a port leading to the interior of the vessel, said fitting being substantially aligned with said axis, said vessel having a wall structure comprising wound high tensile strength flexible material including a layer of convolutions lying substantially in planes through the geometric center of the vessel inclined at a small angle to said axis, said layer being distributed entirely around the vessel, and other layers of convolutions of lesser axial extent distributed entirely around the vessel lying substantially in planes through the geometric center of the vessel and inclined at greater angles to the said axis than said first-mentioned planes.

15. A vessel for storing fluids under high pressure, said vessel comprising an inner spherical elastomeric shell, a fitting secured to said inner shell forming a port for entry and discharge of fluid, said vessel including an outer shell formed of a substantially continuous strand of fiber glass filaments wound about the inner shell in a plurality of layers of windings, each winding at least inboard of the fitting substantially following a great circle path and including a layer of windings extending from a zone adjacent said fitting to a zone diametrically opposite said fitting and other layers of windings having lesser axial extent between said zones.

16. A vessel for storing fluids under high pressure, said vessel comprising an inner spherical shell, a fitting secured to said inner shell forming a port for entry and discharge of fluid, said vessel including an outer shell formed of a substantially continuous strand of fiber glass filaments wound about the inner shell in a plurality of layers of windings, each winding at least inboard of the fitting substantially following a great circle path and including a layer of windings extending from a zone adjacent said fitting to a zone diametrically opposite said fitting and other layers of windings having lesser axial extent between said zones.

17. A vessel for storing fluids under high pressure, said vessel comprising an inner spherical shell, a fitting secured to said inner shell forming a port for entry and discharge of fluid, said vessel including an outer shell formed of a substantially continuous strand of flexible material wound about the inner shell in a plurality of layers of windings, each winding at least inboard of the fitting substantially following a great circle path and including a layer of windings extending from a zone adjacent said fitting to a zone diametrically opposite said fitting and other layers of windings having lesser axial extent between said zones, and bonding means securing said windings to each other.

18. A vessel for storing fluids under high pressure, said vessel comprising an inner spherical shell, a fitting secured to said inner shell forming a port for entry and discharge of fluid, said vessel including an outer shell formed of a substantially continuous strand of flexible material wound about the inner shell in a plurality of layers of windings, each winding at least inboard of the fitting substantiallly following a great circle path and including a layer of windings extending from a zone adjacent said fitting to a zone diametrically opposite said fitting and other layers of windings having lesser axial extent between said zones, said layer of windings extending from the zone adjacent the fitting to a zone diametrically opposite including convolutions partiallly surrounding the fitting to prevent blow-out of the fittings.

19. A vessel for storing fluids under high pressure, said vessel comprising an inner spherical shell, a fitting secured to said inner shell forming a port for entry and discharge of fluid, said vessel including an outer shell formed of a substantially continuous strand of flexible material wound about the inner shell in a plurality of layers of windings, each winding at least inboard of the fitting substantially following a great circle path and the innermost winding extending from a zone adjacent said fitting to a zone diametrically opposite said fitting and succeeding windings having progressively lesser extent between said zones, said innermost winding having convolutions in contact with the fitting and said convolutions being tangent to the fitting at two spaced points on the fitting.

20. A vessel for storing fluids under high pressure, said vessel comprising an inner spherical shell, a first fitting secured to said inner shell forming a port for entry and discharge of fluid, a second fitting diametrically opposite said first fitting, said vessel including an outer shell formed of a substantially continuous strand of flexible material wound about the inner shell in a plurality of layers of windings, each winding at least inboard of the fitting substantially following a great circle path, and windings extending from a zone adjacent said first fitting to a zone adjacent said second fitting and successive windings having progressively lesser extent between said zones, said windings in said zones including convolutions in contact with the fittings, said convolutions being tangent to the fittings at spaced points along the periphery of the fittings.

21. A container for storing fluid medium under pressure comprising a substantiallly spherical shell having an outlet at one pole thereof, and a winding following a great circle path of a thread of high tensile strength material applied about said shell, said winding including successive convolutions arranged in successive layers on the spherical shell, the innermost of said layers substantiallly completely enclosing said shell and the remaining successive layers progressively decrease in polarwise width with the outermost layer being of least polarwise width.

22. A container for storing fluid medium under pressure comprising a substantially spherical shell having an outlet at one pole thereof, and a winding following a great circle path of high tensile strength thread-like material applied about said shell, said winding including successive convolutions arranged in a plurality of at least three layers on the spherical shell, the innermost of said layers substantially completely enclosing said shell and the remaiining successive layers decreasing in polarwise width with the outermost layer being of least polarwise width.

23. A shatter-proof vesssel adapted to hold fluids under high pressure comprising a generally spherical, substantially rigid shell having a wall and a fitting for the entry and discharge of fluid, said fitting being of tubular shape and formed of rigid material, said wall comprising a plurality of layers of windings formed from a substantially continuous strand of flexible material of high tensile strength, each winding following a substantially great circle path, the radially innermost of said windings extending from the fitting zone to a zone diametrically opposite said fitting zone, radially outer windings having progressively lesser axial extent between said zones, and the fitting being securely gripped by said innermost windings.

References Cited in the file of this patent

UNITED STATES PATENTS

| | | |
|---|---|---|
| 720,482 | Richards | Feb. 10, 1903 |
| 2,113,060 | Sandberg | Apr. 5, 1938 |
| 2,221,470 | Brown | Nov. 12, 1940 |
| 2,372,983 | Richardson | Apr. 3, 1945 |
| 2,376,351 | Gay | May 22, 1945 |
| 2,594,693 | Smith | Apr. 29, 1952 |
| 2,611,718 | Steinman | Sept. 23, 1952 |
| 2,614,058 | Francis | Oct. 14, 1952 |
| 2,617,601 | Osborne | Nov. 11, 1952 |

FOREIGN PATENTS

| | | |
|---|---|---|
| 566,610 | France | Nov. 24, 1923 |
| 586,183 | Great Britain | Mar. 10, 1947 |
| 267,351 | Switzerland | Nov. 1, 1950 |
| 282,330 | Switzerland | July 16, 1952 |